Figure 1:
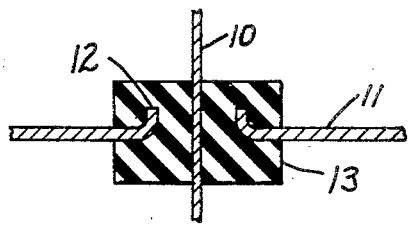

Nov. 20, 1951     P. ROBINSON ET AL     2,576,045

INSULATED ELECTRICAL CONDUCTOR

Filed July 3, 1948

PRESTON ROBINSON
PAUL H. NETHERWOOD
          INVENTORS

Patented Nov. 20, 1951

2,576,045

UNITED STATES PATENT OFFICE 2,576,045

INSULATED ELECTRICAL CONDUCTOR

Preston Robinson, Williamstown, and Paul H. Netherwood, North Adams, Mass., assignors to Sprague Electric Company, North Adams, Mass., a corporation of Massachusetts Application July 3, 1948, Serial No. 36,897

6 Claims. (Cl. 175—41)

Our present invention relates to insulated electrical conductors and, more particularly, refers to solderable electrical conductors insulated from and joined to other conductors by means of certain molded, modified condensation resins. This application is a continuation in part of our copending application, Serial Number 515,382, filed December 23, 1943, now Patent No. 2,444,880, dated July 6, 1948.

The use of condensation resins for insulation purposes is commonplace. The phenol-formaldehyde resins and other resins of this general class may be molded about conductors of various shapes and configurations. Devices so molded are characterized by good resistance to temperature, cracking, and the like. However, they are also subject to certain disadvantages that are inherent in the resins employed. In the first place, the condensation resins usually possess very poor adherence to metal surfaces. This has made it necessary to employ interlayers of materials, such as chlorinated rubber, or to resort to elaborate and difficult designs. Furthermore, in many cases, the shock resistance of the molded device is insufficient, because the molded resins produced from the electrical grades of molding powder conventionally employed, tend to be brittle.

It is an object of our invention to overcome the foregoing and related disadvantages. A further object is to produce improved insulated and joined conductors. Another object is to produce improved terminal assemblies for electrical devices. Yet another object is to produce improved, molded resin encansed condensers. Additional objects will become apparent from the following description and claims.

The foregoing objects are attained in accordance with the present invention by producing an insulated electrical conductor comprising a metal conductor, an adherent film of the metal hydroxide thereon, and a reaction mixture bonded thereto, said mixture consisting of polymerizable thermosetting resin and polymerizable thermoplastic resin which undergoes further reaction in the presence of proton donors. In a more restricted sense the invention is concerned with a metal conductor having an adherent film of the hydroxide of the metal thereon which is insulated from and permanently joined to another metal conductor by a heat and pressure molded reaction mixture of a molded phenol-formaldehyde resin containing from about 1% to about 25% of a resin selected from the class containing polyvinyl formals, polyurethanes, polyesters and polyamides which will react with said hydroxide. All percentages given herein are percentages by weight.

In one of its preferred embodiments the invention is concerned with a terminal assembly consisting of a metal conductor having an adherent metal hydroxide film on the surface thereof, insulated from and permanently joined to a metal sheet through which it passes by a closed path of heat and pressure molded resin mixture, said mixture consisting of phenol-formaldehyde condensation product and material selected from the class containing polyvinyl formals, polyurethanes, polyesters and polyamides which will react with said hydroxide, said resin mixture possessing a linear coefficient of expansion greater than the linear coefficient of expansion of said metal elements. In another of its preferred embodiments the invention is concerned with a terminal assembly consisting of a metal conductor having an adherent metal hydroxide film on the surface thereof, insulated from and permanently joined to a metal sheet through which it passes by a closed path of heat and pressure molded reaction mixture of phenol-formaldehyde resin and polyurethane, which mixture will react with said metal hydroxide.

Our present invention is also concerned with improved reaction mixtures for casting and molding comprising between about 30% and about 90% of a polymerizable thermosetting resin, such as a phenol-formaldehyde resin, between about 0% and about 70% of an inert filling material, such as finely ground inorganic materials and cellulosic products, and from about 1% to about 25% of a polymerizable thermoplastic resin selected from the class of polyvinyl formals, polyesters, polyamides and polyurethanes which will react with proton donors.

In our aforesaid parent application we have described the employment, particularly of melamine-formaldehyde resins, for producing electrically insulating seals and the fabrication of improved, insulated, electrical conductor assemblies, wherein certain properties of the melamine-formaldehyde resins heretofore regarded as undesirable are utilized so as to improve the characteristics of the insulated devices. In that application it is pointed out that the resin should be shrunk on and about the metal surfaces by the polymerization during molding and processing. It is also pointed out therein that phenol-formaldehyde, urea-formaldehyde and similar thermosetting resins are likewise useful, although they are not as satisfactory for this purpose as are the melamine-formaldehyde resins, because the seal obtained between the resin and the conductor is not as strong.

According to our present invention, we have found that reaction mixtures of thermosetting condensation resins with materials which react with proton donors and also exert a plasticizing action, can be employed with outstanding results in the manufacture of insulated conductor assemblies, such as are represented by terminal arrangements and resin encased condensers. The metal conductor must have an adherent metal hydroxide film thereon. The modifying agents which we have found to be very satisfactory for use in accordance with our invention, are certain types of polyvinyl formals series, polyesters, polyamides, and polyurethanes. It is desirable, in accordance with our invention, that the linear coefficient of expansion of the plastic material be greater than that of the underlying conductor.

The conductors to which our invention is applicable generally comprise those having solderable surfaces containing predominant amounts of copper, tin, lead, zinc, and/or aluminum. The preferable surface is tin. It will be noted that aluminum is included as a solderable surface. This material is widely used in the electrical industry and there are a number of suitable solders that may be used therewith, without the need for an undesirable acid flux. The configuration and shape of the conductor may be widely varied. Typical examples of such conductors are terminal wires, rivets, container sheets and the like.

In each case, however, the conductor surface should be treated to form in situ an adherent hydroxide film on the surface thereon. After cleaning to remove grease and scale, the conductor should be exposed to oxygen and moisture to produce the film. Representative conditions are a temperature of about 50° C. and air of about 20% to about 80% humidity for 30 minutes. This film is only a few molecules thick at the most, and reference to a film should be interpreted to mean a layer on the order of a few molecules thick. We have found that layers of a thickness of this order do not interfere with subsequent soldering of the conductor. In some cases, such as with tin, the film is probably a hydrated metal oxide, which is satisfactory for the purpose, acting as a proton donor for reaction with the insulating mixture. We prefer that the film be thin, as a poor bond is obtained when the thickness of the hydroxide or hydrate doxide film becomes appreciable.

The types of polymerizable thermosetting resins that may be used in accordance with the invention include phenol-formaldehyde resins, phenol-furfural resins, aniline-formaldehyde resins, diphenylamine-formaldehyde resins, resorcinol-formaldehyde resins, urea-formaldehyde resins and the like. The preferred resins are the phenol-formaldehyde resins, either the one-step condensation type or the two-step type in which hexamethylene tetramine is an ingredient in the second step condensation.

The polymerizable thermoplastic resin is selected from the class containing polyvinylformals, polyurethanes, polyesters and polyamides and the thermoplastic resin must be capable of further reaction in the presence of and preferably with proton donors.

Polyvinyl formal refers to the resinous reaction products of an aldehyde with polyvinylalcohol, in which some, but not all, of the adjacent hydroxy groups are condensed with the aldehyde. Polyvinyl formal is produced when the aldehyde is formaldehyde; acetaldehyde leads to polyvinylacetal etc. There should be left between about 10% and about 50% of the original hydroxy groups available in the polymer.

Polyesters refer to the resins obtained by condensing difunctional acids and bases, such as the following combinations:

1. dibasic acids and glycols
2. dibasic acid, glycols and hydroxycarboxylic acids
3. glycols, diamines and dibasic acids
4. dibasic acids, glycols and amino alcohols
5. dibasic acids, amino acids and glycols Polyamides refer to the resins obtained by condensing diamines with dibasic acids. The polyester resins and the polyamide resins are difficult to separate in nomenclature when both amino and hydroxy groups are present in one or more of the reactants and when polyhydroxy compounds, such as glycols, and diamines are both present in the reactant mixture. In addition to the combinations (3), (4) and (5) above, other thermoplastic polyamide resin compositions may be produced from the following:

1. amino alcohols and dibasic acids
2. amino acids, amino alcohols and dibasic acids
3. amino alcohols, dibasic acids and hydroxycarboxylic acids As previously mentioned the polyester and polyamide resins must be capable of further reaction with or in the presence of proton donors. For this reason, it is preferable that an excess of acidic groups is present in the resin as incorporated in the insulating reaction mixture. This may be accomplished in the formulation of the resin by employing an excess of the dibasic acid. For example, the following proportions may be employed in the preparation of the resins:

*Example A.—Polyester resin*

224 gms. adipic acid
30.5 gms. ethanol amine
62 gms. ethylene glycol
50 gms. water The resin may be produced by heating the reactants for 3 hours at 150° C., followed by 3 hours at 175° C. under 2½ mm. pressure.

*Example B.—Polyamide resin*

232.5 gms. hexamethylene diamine
152 gms. adipic acid
205 gms. sebacic acid

The above mixture was heated for 3 hours at 150° C. (atmospheric pressure) and subsequently for 8 hours at 195° C. under 2½ mm. pressure.

The polyurethanes are resins produced by reacting aliphatic or aromatic di- and tri-isocyanates with polyhydroxy compounds. Representative reactants are hexamethylene di-isocyanate with ethylene glycol and toluene di-isocyanate with pentamethylene glycol. An excess of isocyanate groups should be present, in order that the resin will react further in the presence of the proton donor and, in some cases, to copolymerize with the thermosetting resin constituent of the reaction mixture employed in accordance with the invention. The following example describes the preparation of a polyurethane resin which may be employed in the practice of the present invention.

Example C.—Polyurethane 180 gms. toluene-2,4-di-isocyanate
60 gms. trimethylol propane
52 gms. pentamethylene glycol The mixture was heated at 110° C. for 10 hours to effect polymerization. The resinous mass produced was stored in a dry atmosphere prior to its incorporation in the reaction mixture.

The polymerizable thermoplastic resin should be present in an amount of between about 1% and about 25% by weight of the thermosetting condensation resin. Since the molding reaction mixtures generally have a filler material, the overall range for the molding composition is generally between about 30% and about 90% of the thermosetting resin, between about 0% and about 70% of inert filler, and between about 1% and about 25% of the thermoplastic resin.

Fillers suitable for the resins of the invention include ground mica, asbestos, talc and related inorganic materials, and wood flour, cotton linters, rags and other organic materials.

The molding cycle may be conducted in the usual manner, employed with thermosetting resin molding powders. Generally the molding temperature is from 270° F. to 350° F., and the time will vary from a few seconds to 15 minutes or more, depending upon the particular resin mixture employed and the size of the assembly to be produced. The pressure is generally between about 250 and about 20,000 pounds per square inch.

The design of the article should be such that, as described in the parent application, the finished molded article will comprise two conductors about which the molded resin has been shrunk during the curing operation, forming a closed path therebetween. By following the teachings of our invention, it is possible to produce resin insulated articles in which the bond between the conductors and the resin is unusually strong, permanent and resistant to moisture and oil transmission. The insulation per se possesses greatly improved shock-resistance and moisture-resistance, due to the presence of the thermoplastic resin within the resin mass.

Figure 2:
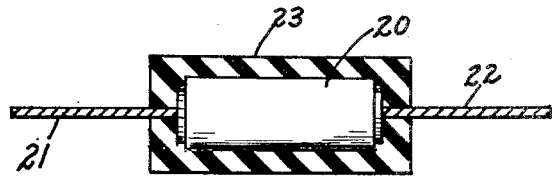

The invention will be further described with reference to the appended drawing, in which, Figure 1 represents a cross section of a terminal assembly produced in accordance with the invention and Figure 2 represents a cross section of an electrical condenser of the invention.

Referring more specifically to Figure 1, 10 represents a terminal element for an electrical device which is insulated from conductor 11, the latter generally being a sheet of metal, such as employed for the top of a container. Both terminal 10 and sheet 11 are treated to produce an adherent hydroxide film on the surfaces thereof, as heretofore described. The metal sheet 11 may be provided with a lip 12. Separating the conductors with a closed path and tightly bonded to the conductors is insulation 13 which comprises one of the molded resins of the invention. It will be noted that the resin exerts compression upon the metal surfaces which it contacts, at all temperatures below the molding temperature, since the resin possesses a greater linear coefficient of expansion.

Figure 2 shows a condenser section 20, such as is produced by convolutely rolling electrode foils which are separated and insulated from each other by impregnated dielectric material, the condenser being provided with solderable terminal wires 21 and 22. Completely enclosing the condenser and a portion of each of the terminal wires, providing a closed path therebetween, is a molded resin casing 23. The resultant condenser is positively insulated, and the terminal wires are bonded to the insulation, so that the moisture resistance and durability of the unit under adverse conditions are outstanding.

According to one of the limited embodiments of the invention, the material to which the resin is bonded should have a tinned layer with an adherent tin hydroxide or hydrated tin oxide film thereon. In accordance with one of the preferred embodiments of the invention, this tinned layer is a porous, crystalline coating produced by electrolytic deposition from a solution containing the appropriate stannic ion.

While the description of Figures 1 and 2 has been particularly directed to terminal assemblies and to electrical condensers, it is apparent that the invention is applicable to many other kinds of electrical conductors, such as those employed in circuit breakers, arc extinguishing devices, coil and coil formed assemblies, hermetically sealed resistor assemblies and various other appliances used in the electrical art. The insulated conductors of the invention are characterized by an excellent bond between the resin and the conductor, outstanding durability under adverse physical conditions, pronounced resistance to moisture, shock, etc.

As many different embodiments of this invention may be made without departing from the spirit and scope hereof, it is to be understood that the invention is not limited to the specific embodiments hereof, except as defined in the appended claims.

What we claim is:

1. An electric circuit component having a casing and an electrically conductive terminal lead projecting out through said casing for connection in a circuit, said lead having an external metal surface which is predominantly at least one metal of the class consisting of copper, tin, zinc, lead and aluminum; an in situ formed adherent film of hydroxide on said metal surface, said filmed surface being permanently sealed to said casing by a heat and pressure molded non-conductive reaction mixture of a polymerizable thermosetting resin selected from the class consisting of phenol-formaldehyde resins, phenol-furfural resins, aniline-formaldehyde resins, diphenylamine-formaldehyde resins, resorcinol-formaldehyde resins and urea-formaldehyde resins, modified with from about 1% to about 25% of a second resin selected from the class consisting of polyvinyl formals, polyurethanes, polyesters and polyamides.

2. An electric circuit component having a metal casing and an electrically conductive terminal lead projecting out through an opening in said casing for connection in a circuit, both said casing and said lead having an external metal surface which is predominantly at least one metal of the class consisting of copper, tin, zinc, lead and aluminum; an in situ formed adherent metal hydroxide film on said metal surfaces, said opening being sealed by a heat and pressure molded mixture of a polymerizable phenol-formaldehyde condensation product and from about 1% to about 25% of a resin selected from the class consisting of polyvinyl formals, polyurethanes, polyesters and polyamides based on the weight of said condensation product, said molded mixture adhering to and possessing a linear coefficient of thermal expansion greater than the linear coefficient of thermal expansion of said metal casing and said terminal lead.

3. An electrical condenser comprising two convolutely wound insulated electrode strata, a tin coated terminal wire connected to one electrode stratum at one edge of the winding, and another tin coated terminal wire connected to the other electrode stratum at the other edge of the winding, the exposed surfaces of said tinned wires having an adherent in situ formed film of tin hydroxide thereon, the wound assembly and the portions of the terminal wires adjacent to the winding being encased and surrounded in a heat and pressure molded resin mixture of a polymerizable phenol-formaldehyde condensation product and from about 1% to about 25% of polyvinyl formal resin, said molded mixture possessing a linear coefficient of thermal expansion appreciably greater than that of said terminal wires.

4. The combination as defined by claim 2 in which the metal lead surface contains a predominant amount of tin, and the resin is a polyurethane formed by condensing an excess of a polyisocyanate with a polyhydroxy compound.

5. The combination as defined in claim 1 in which the second resin is a resin of improved reactivity resulting from resinification of a resin-forming ingredient mixture having one of these ingredients present in stoichiometric excess.

6. An electric circuit component having a casing and an electrically conductive terminal lead projecting out through said casing for connection in a circuit, said lead having an external metal surface which is predominantly at least one metal of the class consisting of copper, tin, zinc, lead and aluminum; an in situ formed adherent film of hydroxide on said metal surface, said filmed surface being permanently sealed to said casing by a heat and pressure molded nonconductive reaction mixture of about 30% to about 90% of a polymerizable thermosetting resin selected from the class consisting of phenol-formaldehyde resins, phenol-furfural resins, aniline-formaldehyde resins, diphenylamine-formaldehyde resins, resorcinol-formaldehyde resins and urea-formaldehyde resins, modified with from about 1% to about 25% of a second resin selected from the class consisting of polyvinyl formals, polyurethanes, polyesters and polyamides, and about 0 to about 70% of an inert filling material.

PRESTON ROBINSON.
PAUL H. NETHERWOOD.

REFERENCES CITED

The following references are of record in the file of this patent:

UNITED STATES PATENTS

| Number | Name | Date |
|---|---|---|
| 1,894,644 | Sturdevant | Jan. 17, 1933 |
| 1,973,038 | Benedek | Sept. 11, 1934 |
| 2,169,967 | Smith | Aug. 15, 1939 |
| 2,266,353 | Carney | Dec. 16, 1941 |
| 2,307,588 | Jackson et al. | Jan. 5, 1943 |
| 2,320,999 | Beebe | June 8, 1943 |
| 2,395,894 | May | Mar. 5, 1946 |
| 2,421,652 | Robinson | June 3, 1947 |
| 2,426,609 | Hodgdon | Sept. 2, 1947 |
| 2,448,513 | Brennan et al. | Sept. 7, 1948 |
| 2,458,746 | Stupakoff | Jan. 11, 1949 |
| 2,459,543 | Schmerheim | Jan. 18, 1949 |

FOREIGN PATENTS

| Number | Country | Date |
|---|---|---|
| 107,688 | Australia | June 22, 1939 |

OTHER REFERENCES

Metal Progress, July 1948, page 41.